United States Patent
Hakkani-Tur et al.

(10) Patent No.: US 7,562,014 B1
(45) Date of Patent: *Jul. 14, 2009

(54) ACTIVE LEARNING PROCESS FOR SPOKEN DIALOG SYSTEMS

(75) Inventors: Dilek Z Hakkani-Tur, Parsippany, NJ (US); Mazin G Rahim, Warren, NJ (US); Giuseppe Riccardi, Hoboken, NJ (US); Gokhan Tur, Parsippany, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/862,008

(22) Filed: Sep. 26, 2007

Related U.S. Application Data

(63) Continuation of application No. 10/447,888, filed on May 29, 2003, now Pat. No. 7,292,976.

(51) Int. Cl.
*G06F 17/27* (2006.01)
*G10L 15/00* (2006.01)

(52) U.S. Cl. .............. 704/236; 704/231; 704/9
(58) Field of Classification Search .......... 704/231, 704/236
See application file for complete search history.

(56) References Cited

U.S. PATENT DOCUMENTS

| | | | |
|---|---|---|---|
| 5,758,319 A | 5/1998 | Knittle | |
| 5,903,864 A | 5/1999 | Gadbois et al. | |
| 6,009,392 A | 12/1999 | Kanevsky et al. | |
| 6,138,099 A | 10/2000 | Lewis et al. | |
| 6,665,640 B1 | 12/2003 | Bennett et al. | |
| 6,792,406 B1 | 9/2004 | Fujimura et al. | |
| 7,136,818 B1 | 11/2006 | Cosatto et al. | |
| 2001/0018654 A1 | 8/2001 | Hon et al. | |
| 2003/0191625 A1 | 10/2003 | Gorin et al. | |

OTHER PUBLICATIONS

D. Cohn, L. Atlas, and R. Ladner, "Improving Generalization with Active Learning," *Machine Learning*, vol. 15, pp. 201-221, 1994.
D.D. Lewis and J. Catlett, "Heterogeneous Uncertainty Sampling for Supervised Learning," in *Proc. of the 11th International Conference on Machine Learning*, 1994, pp. 148-156.
I. Dagan and S.P. Engelson, "Committee-Based Sampling for Training Probabilistic Classifiers," in *Proc. Of the 12th International Conference on Machine Learning*, pp. 150-157, 1995.
C. Thompson, M. E. Califf, and R.J. Mooney, "Active Learning for Natural Language Parsing and Information Extraction," in *Proc. of the 16th International Conference on Machine Learning*, pp. 406-414, 1999.
A. L. Gorin, A. Abella, T. Alonso, G. Riccardi, and J. H. Wright, "Automated Natural Spoken Dialog," *IEEE Computer Magazine*, vol. 35, No. 4, pp. 51-56, Apr. 2002.

(Continued)

*Primary Examiner*—David R Hudspeth
*Assistant Examiner*—Justin W Rider

(57) ABSTRACT

A large amount of human labor is required to transcribe and annotate a training corpus that is needed to create and update models for automatic speech recognition (ASR) and spoken language understanding (SLU). Active learning enables a reduction in the amount of transcribed and annotated data required to train ASR and SLU models. In one aspect of the present invention, an active learning ASR process and active learning SLU process are coupled, thereby enabling further efficiencies to be gained relative to a process that maintains an isolation of data in both the ASR and SLU domains.

18 Claims, 4 Drawing Sheets

OTHER PUBLICATIONS

A. L. Gorin, G. Riccardi, and J. H. Wright, "How May I Help You?," Speech Communication, 1997.

M. Tang, X. Luo, and S. Roukos, "Active Learning for Statistical Natural Language Parsing," in *Proceedings the ACL*, 2002.

M. Sassano, "An Empirical Study of Active Learning with Support Vector Machines for Japanese Word Segmentation," in Proceedings the ACL, 2002.

D. Hakleani-Tur, G. Riccardi, and A. Gorin, "Active Learning for Automatic Speech Recognition," in *Proceedings of the ICASSP*, 2002.

G. Tur, R. Schapire, and D. Hakkani-Tur, "Active Learning for Spoken Language Understanding,," Hong Kong, May 2003.

Wessel, F. Baader, A. "Robust dialogue-state dependent language modeling using leaving-one-out", ICASSP '99., 1999 IEEE International Conference on, Mar. 15-19, 1999, vol. 2, pp. 741-744.

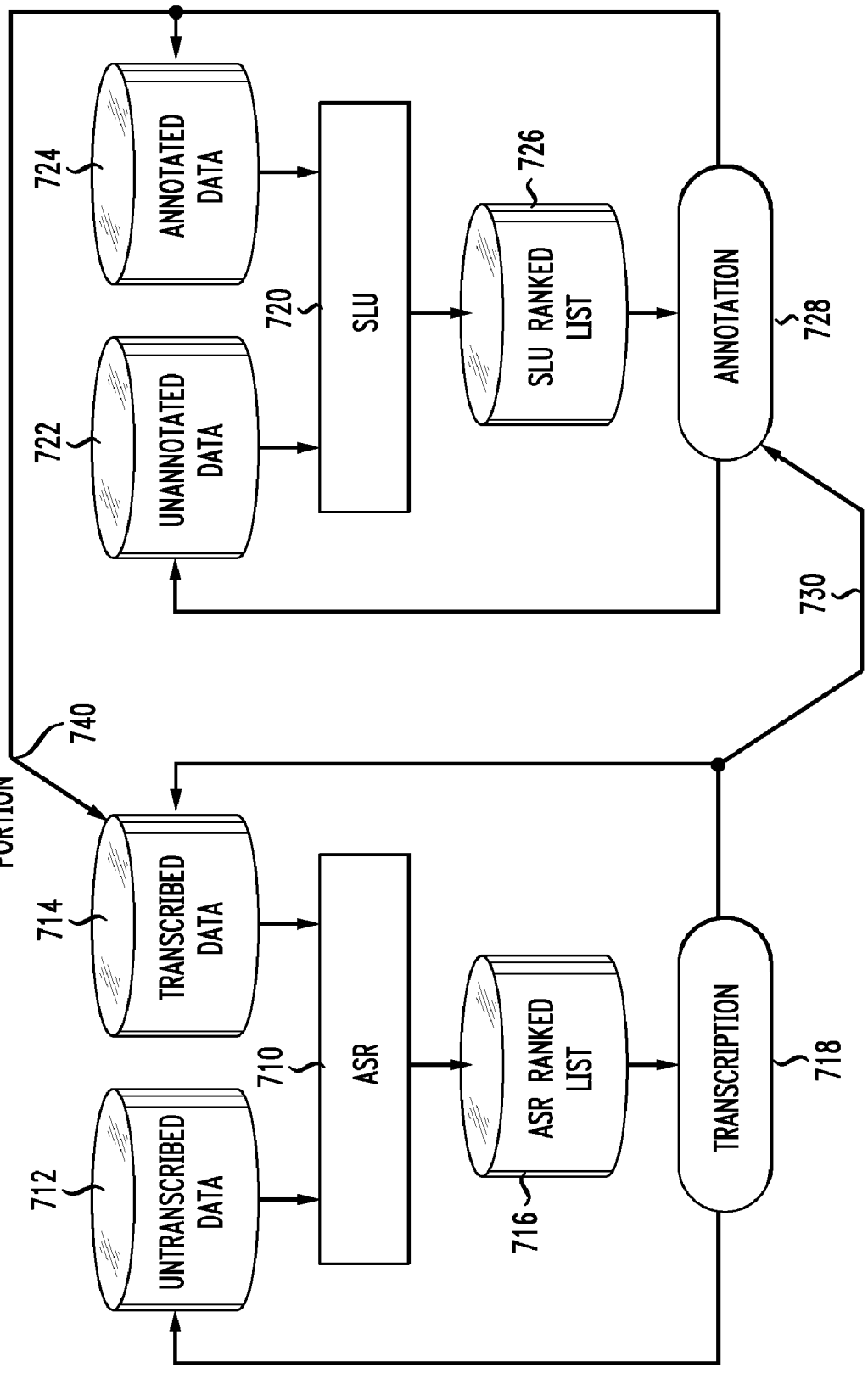

ACTIVE LEARNING PROCESS FOR SPOKEN DIALOG SYSTEMS

PRIORITY

The present application is a continuation of U.S. patent application Ser. No. 10/447,888, filed May 29, 2003, the contents of which is incorporated herein by reference in its entirety.

BACKGROUND

1. Field of the Invention

The present invention relates generally to natural language spoken dialog systems and, more particularly, to an active learning process for spoken dialog systems.

2. Introduction

Voice-based natural dialog systems enable customers to express what they want in spoken natural language. Such systems automatically extract the meaning from speech input and act upon what people actually say, in contrast to what one would like them to say, shifting the burden from the users to the machine. In a natural language spoken dialog system, identifying the speaker's intent can be seen as a general classification problem. Once the speaker's intent is determined, the natural language spoken dialog system can take actions accordingly to satisfy their request.

In a natural language spoken dialog system, the speaker's utterance is recognized first using an automatic speech recognizer component. Then, the intent of the speaker is identified (or classified) from the recognized speech sequence using a spoken language understanding component.

When statistical recognizers and classifiers are employed, they are trained using large amounts of task data, which are transcribed and annotated by humans. This transcription and labeling process is a very expensive and laborious process. What is needed therefore is a process that enables the building of better statistical recognition and classification systems in a shorter time frame.

SUMMARY

A large amount of human labor is required to transcribe and annotate a training corpus that is needed to create and update models for automatic speech recognition (ASR) and spoken language understanding (SLU). Active learning enables a reduction in the amount of transcribed and annotated data required to train ASR and SLU models. In one aspect of the present invention, an active learning ASR process and active learning SLU process are coupled, thereby enabling further efficiencies to be gained relative to a process that maintains an isolation of data in both the ASR and SLU domains.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates an embodiment of an active learning loop.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
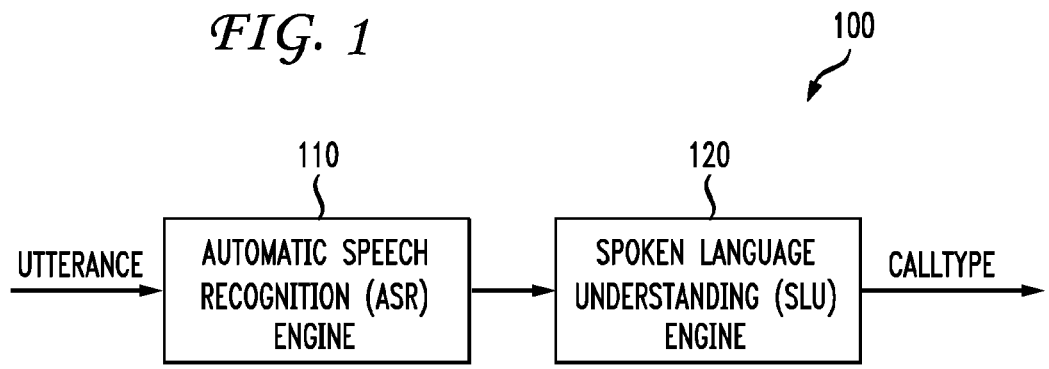
FIG. 1 illustrates a basic architecture of a natural language spoken dialog system.

A basic architecture of a natural language spoken dialog system is illustrated in FIG. 1. As illustrated, natural language spoken dialog system 100 includes a large vocabulary automatic speech recognition (ASR) engine 110 that relies on one or more knowledge sources (e.g., acoustic and language models) to extract words from user speech. Natural language spoken dialog system 100 also includes a spoken language understanding (SLU) engine 120 that is operative to extract meaning from the output of ASR engine 110 and classify customer requests. For example, SLU engine 120 can be designed to classify input telephone calls into various calltypes (or classes), such as Billing Credit, Calling Plans, etc. An embodiment of a natural language spoken dialog system 100 is exemplified by AT&T's How May I Help You (HMIHY) natural dialog system.

The process of assigning one or more classification types (e.g., calltypes) to individual utterances is a very expensive and laborious process. The costs both in human capital and in delays in the delivery of new or improved products are critical factors that can impede success in a competitive environment.

Active Learning (AL) is designed to aid and automate the labor-intensive process of building and training models for natural language applications. One of the goals of an AL system is to significantly reduce the amount of transcribed and annotated (transcribed and labeled) data required to train ASR and SLU models with a given level of accuracy. This reduction in transcribed and annotated data will reduce the cost and time-to-market for natural language services.

AL is intended to improve the process of training an accurate model of a hypothesis using supervised machine learning techniques. In supervised learning, a corpus of examples is annotated by human experts according to some criteria. Then, a machine-learning algorithm is applied to that corpus to create a model hypothesis that closely approximates the criteria. This is known as training a model. The corpus used to train the model is known as training data.

The actual type of model produced depends on the machine-learning algorithm. It could be a set of rules, a decision tree, the coefficients to a mathematical expression such as a linear vector, logistic function or neural network, etc. However, all models have one central thing in common: once the model has been trained, it can then be applied to unseen examples to classify (or regress) them according to the hypothesis. The output of the model applied to a new example should ideally agree with the annotation applied by a human expert to that example. This is referred to as the test phase. Of course, the trained model is often only an approximation of the true hypothesis, and mistakes are to be expected. Reducing the error rate and improving the accuracy is the concern of machine learning algorithm designers.

Typically, the annotated corpus available for model creation is split into a training and test set (the training set is usually larger than the test set), so that error rates can be computed when classifying the test set (since the annotations represent what the classifications should have been versus what they actually were). Ideally, the training/test corpus should represent a random sample of the distribution of all possible examples in the example space that may be applied to the model. Thus, the corpus is representative of the distribution and corpus statistics will accurately represent the true distribution statistics.

In an operational system, once a model has been trained and approved it will be deployed into the field as part of a software system that provides some kind of service. The system may be active for months or even years. As new examples are applied to the model for recognition and classification, they can be saved by the system and sent to the human experts for transcription and annotation. The original corpus of transcription and annotation examples used to train and test the original model may be augmented with new transcription and annotation examples. The enlarged corpus may be used to train a new and hopefully more accurate model. Even if the model is deemed accurate enough, as time goes by the distribution of the example space may shift, and it becomes necessary to periodically add new transcription and annotation examples to the corpus (possibly removing some older examples) to keep the trained model current.

If the system is heavily used, there is potentially a huge amount of new examples that could be used to augment the original corpus to build a new model. The amount of new examples may be larger than the number of examples that can be transcribed and annotated by the available staff of human experts. The question then becomes how to choose the subset of new examples to be transcribed and annotated. A traditional technique is to simply take a random sample. AL attempts to do better than random sampling by ranking the set of new examples according to some metric that measures how helpful that new example is toward improving the model. The subset of size M selected for transcription and the subset of size N selected for annotation then represent the highest-ranking M and N examples according to the metric.

Figure 2:
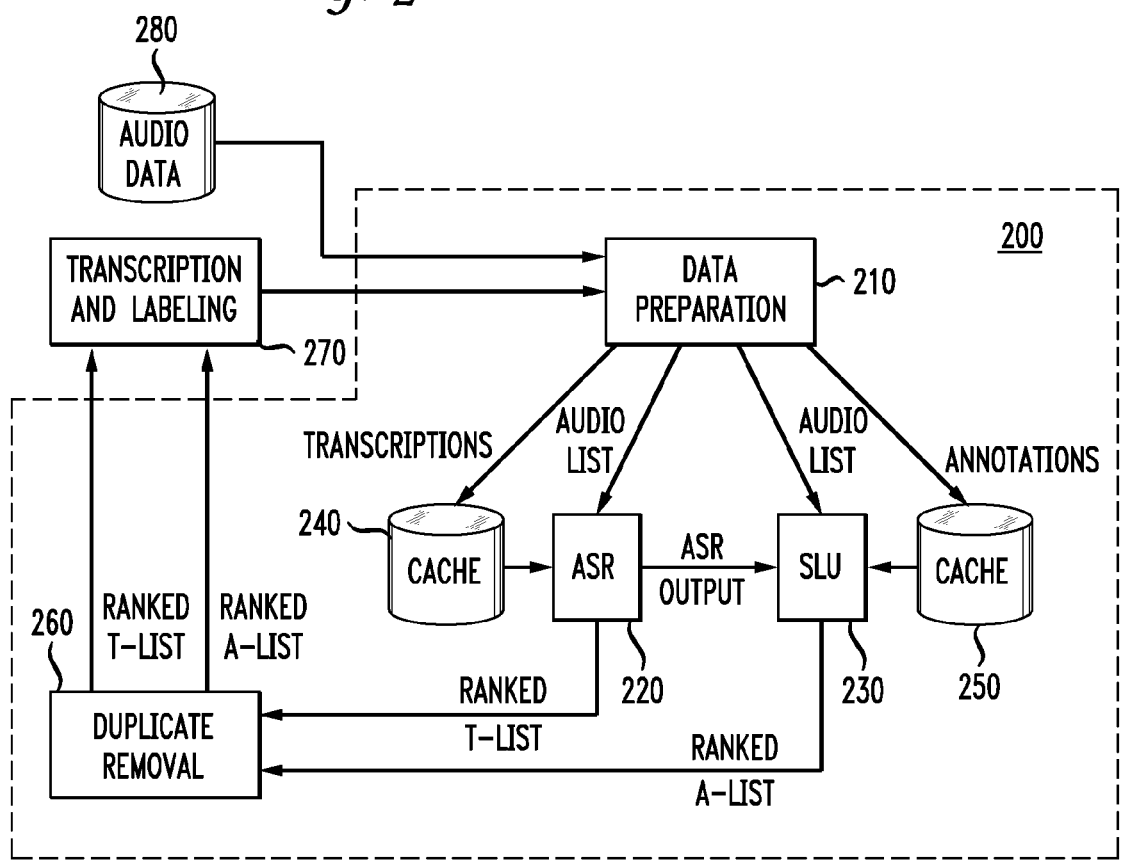
FIG. 2 illustrates a natural language spoken dialog system that includes an active learning component in accordance with the present invention.
Figure 3:
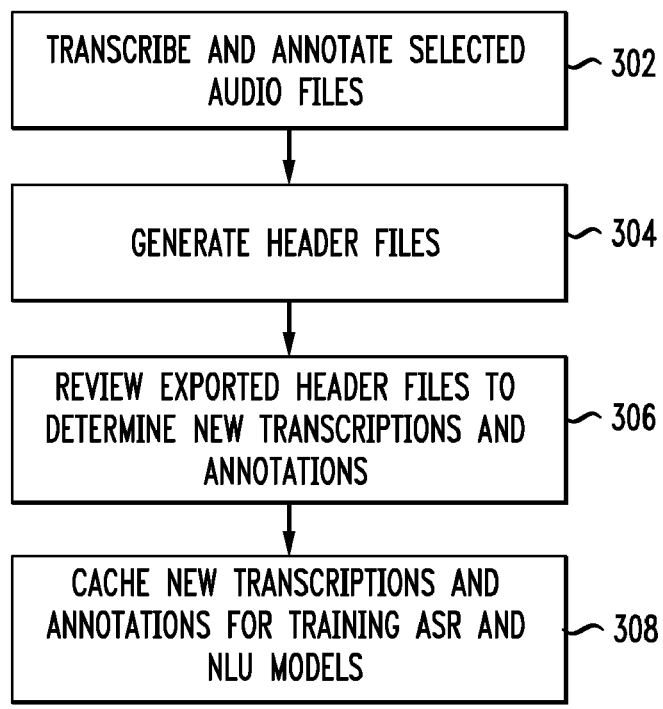
FIG. 3 illustrates a flowchart of a process of identifying new transcription and annotation data.

An embodiment of a natural language spoken dialog system that includes an AL process is illustrated in FIG. 2. As illustrated, the spoken dialog system includes AL system 200, which operates in conjunction with audio data store 280 and transcription and labeling lab 270. AL is used in conjunction with the process of transcribing and labeling (or calltyping) new examples produced by the deployed system. FIG. 3 illustrates a flowchart of the process of generating new transcriptions and annotations for training the ASR and SLU models.

As illustrated in FIGS. 2 (system) and 3 (method), the process begins at step 302, where transcriptions and labels for selected audio files stored in audio data store 280 are generated. The process of selecting particular audio files is described in greater detail below.

The work of transcription and labeling is also known as annotating, and the work is performed at transcription and labeling lab 270. In transcription and labeling lab 270, the process of completely annotating a new example is broken into two steps: transcribing audio into text, and labeling the text transcription into one or more classification types (e.g., calltypes). Typically, different individuals will specialize in the particular steps. Alternatively, of course, a single individual may be called upon to perform both the transcription and labeling steps.

In a typical daily process, the expert transcribers and labelers in transcription and labeling lab 270 produce completed transcriptions, with or without annotated calltypes. At step 304, the transcriptions and any labels for a particular audio file are placed in a header file. At a designated time, a process is executed by transcription and labeling lab 270 that performs some automated checks on the header files operated on that day, and copies finished header files into an assigned file directory In one embodiment, the filename and path of each header file has a direct mapping to the path to its originating audio file. When finished, the process creates a semaphore file signaling completion.

Data preparation module 210 looks for the semaphore file to determine when transcription and labeling lab 270 has completed their work. Upon detection of the semaphore file, data preparation module 210, at step 306, can then proceed to review the exported header files to identify any new transcriptions and annotations generated by transcription and labeling lab 270.

Next, at step 308, the newly identified transcriptions and annotations are cached for use in training ASR and SLU models. Specifically, data preparation module 210 caches new transcription data in cache 240 and annotation data in cache 250.

Figure 4:
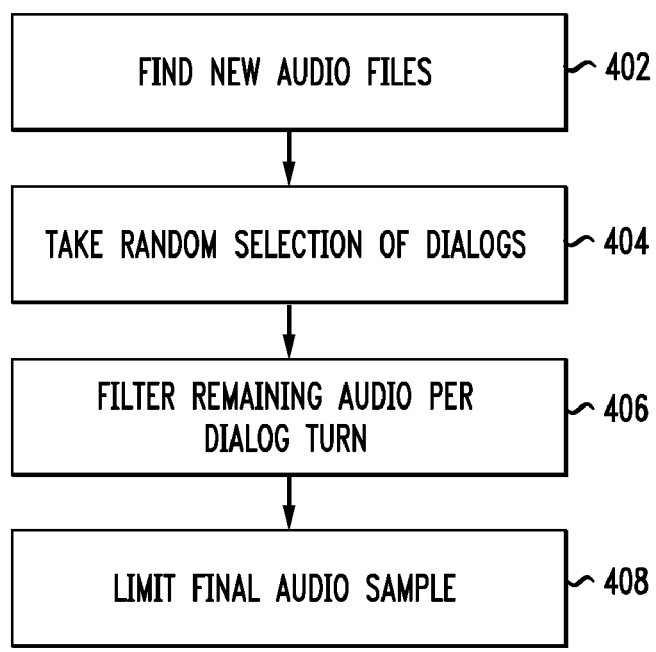
FIG. 4 illustrates a flowchart of a process of identifying a set of audio files for an active learning process.

In addition to the identification of new transcription and annotation data, data preparation module 210 also identifies a set of audio dialog files to be used in the AL process. FIG. 4 illustrates a flowchart of a process of identifying a set of audio dialog files for an AL process.

As illustrated, this process begins at step 402, where new audio dialog files (e.g., 16-bit PCM coding, 8-bit IEEE µ-law coding, etc.) are identified. In one embodiment, the set of all new audio dialog files are discovered in a file directory tree based on a timestamp. To prevent the search for new audio dialog files from growing too long as the amount of audio under the directory tree grow large, the search can be bounded by looking at directories that contain audio dialog files created in the last N (e.g., 14) days.

Next, at step 404, a random selection of the new audio dialog files is taken such that only a percentage of the new audio dialog files is selected. These randomly selected audio dialog files are removed from any remaining AL processing and can be used for later system testing of the natural language spoken dialog system.

At step 406, the remaining set of audio dialog files is filtered to remove any audio that does not correspond to the first N turns in the call dialog. N is a configurable parameter. It should be noted that AL processing can also be run on responses to specific prompts in addition to the first N turns in the call dialog.

At step 408, the filtered set of audio dialog files is then randomized and a subset chosen for passing on to the AL ranking process. If the total number of randomized audio dialog files in the filtered set is larger than a maximum sample size, then the set can be truncated accordingly. This prevents an unusually large number of new audio dialog files from swamping the AL system's ability to complete its processing in a given time window.

As illustrated in FIG. 2, the final list of audio dialog files stored in audio data store 280 is then provided to ASR module 220 and to SLU module 230 for AL processing. In this AL processing, both ASR module 220 and SLU module 230 seek to reduce the number of training samples to be transcribed and annotated, respectively, by selecting the most informative samples based on a given cost function. In other words, both ASR module 220 and SLU module 230 are designed to prioritize the audio dialog files so that those which help improve the ASR and SLU models the most, respectively, are ranked highest.

In one embodiment, the ASR process uses two automatically trained models: an acoustic model and a stochastic language model (SLM). The acoustic model categorizes the speech waveform into a sequence of phonemes (or similar sub-word components), while the SLM organizes the phonemes into words. In the context of AL, it is desired to improve one or more ASR models while minimizing the corpus of data that is used for training the model.

Figure 5:
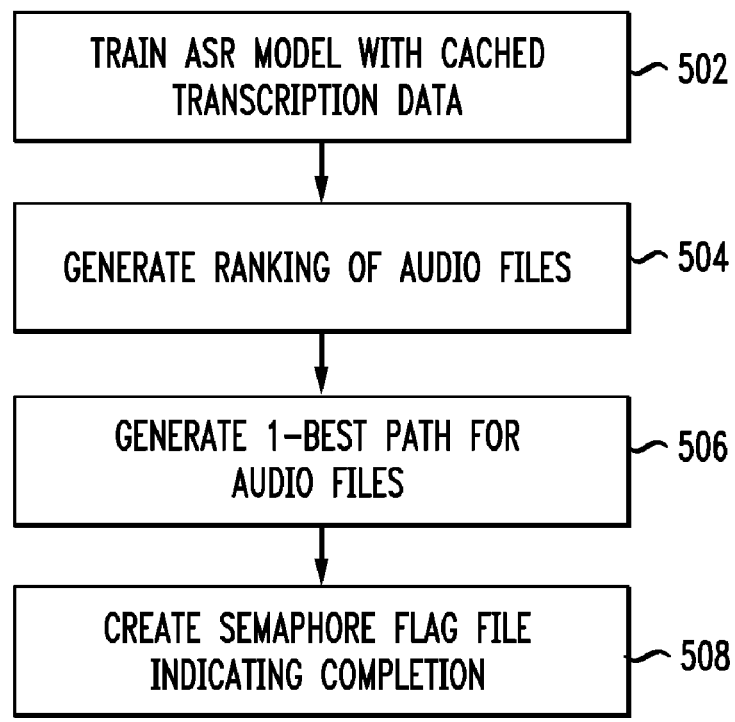
FIG. 5 illustrates a flowchart of the processing performed by an automatic speech recognition module.

The processing performed by ASR module 220 in reducing the amount of data needed to train the ASR model is now provided with reference to the flowchart of FIG. 5. As illustrated, the process begins at step 502 where the ASR model is first trained with transcription data that is stored in cache 240. As noted above, cache 240 is continually updated with new transcription data that is generated by transcription and labeling lab 270.

Once the ASR model is trained, ASR module 220 can then proceed, at step 504, to rank the audio dialog files that are included in the list of audio dialog files that was provided by data preparation module 210. In general, the audio files can be ranked by processing the audio files with an ASR engine and applying metrics to the recognitions. As would be appreciated, this ranking process will vary depending upon the particular model being trained. In the following description, an example of the application of AL processing to the identification of samples for training a SLM is provided.

In this process, the original coding format (e.g., linear 16-bit PCM or 8-bit IEEE μ-law) of each audio dialog file is converted into cepstrum format. A binary finite state machine (FSM) lattice is then produced for each cepstrum file. This FSM includes costs that are obtained by combining acoustic and language model probabilities, which are used to estimate word confidence scores.

Next, a ranking of the FSMs is generated using the pivot alignment of each FSM. The pivot alignment includes word scores and a measure of confidence in the prediction of that word by the ASR engine. Here, for each FSM, (1) the best pivot-alignment path through it is converted into the ASCII text representation of the utterance, including the word scores, (2) the mean word score for each utterance is calculated, and (3) the utterances (represented by originating cepstrum files) are ranked according to mean word score.

Finally, the ranked list of cepstrum files is mapped back to original audio dialog files, producing the final ranked transcription list (T-List). This final ranked T-List is then output by ASR module 220.

In addition to the final ranked list, at step 506, ASR module 220 also generates for each audio file the 1-best path through the FSM lattice and converts it into ASCII text. This 1-best ASCII output is provided to SLU module 230 for use in the SLU module's ranking algorithm.

Finally, at step 508, ASR module 220 creates a semaphore flag file that indicates to SLU module 230 that it is finished.

Figure 6:
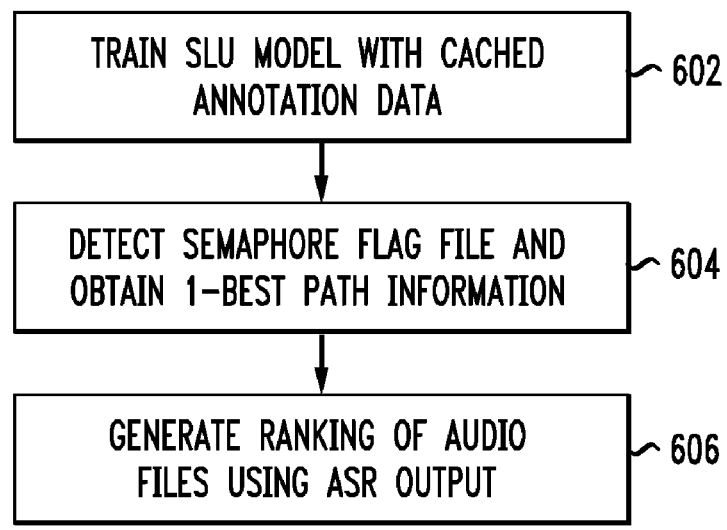
FIG. 6 illustrates a flowchart of the processing performed by spoken language understanding module.

The processing of SLU module 230 is now described with reference to the flowchart of FIG. 6. This process begins at step 602 where SLU module 230 trains the SLU classifier model with annotation data stored in cache 250. After the SLU classifier model is trained, at step 604, SLU module 230 looks for the semaphore flag file. Once the semaphore flag file is detected, SLU module 230 obtains the 1-best path information that is generated by ASR module 220.

Next, at step 606, this 1-best path information is used to run the SLU ranking algorithm that ranks the audio files in the provided list. In one embodiment, the SLU ranking algorithm is based on confidence scores that are generated by the trained classifier. Here, the lower confidence scores would be ranked higher for subsequent annotation since those low confidence scores represent utterances that are not easily classified by the trained classifier. The final ranked annotation list (A-List) is then output by SLU module 230.

As illustrated in FIG. 2, the outputs of both ASR module 220 and SLU module 230 are provided to duplicate removal module 260. At this point, there exists two lists of N ranked audio files, wherein the ranking order generated by ASR module 220 and SLU module 230 are distinct.

Here, it should be noted that it is only necessary to both transcribe and label the SLU ranked list, while the ASR ranked list only needs to be transcribed. Therefore, the two lists should be mutually exclusive to avoid unnecessary transcription duplication.

In one embodiment, the SLU ranked A-List is first truncated to a predefined maximum number of entries. After truncating the SLU ranked A-List, any entry in the ASR ranked T-List that is in the truncated SLU A-List is removed from the ASR ranked T-List. The two ranked lists are now mutually exclusive. The ASR ranked A-List may also be truncated. The mutually exclusive ranked lists are then provided to transcription and labeling lab 270 for transcription and labeling.

At this point, the ranked lists represent a prioritization of the audio files based on the potential to improve the ASR and SLU models. As noted, the daily volume of logged audio is often too large for transcription and labeling lab 270 to transcribe and annotate completely. Thus, a subset of the audio dialog files is selected for processing. It is a feature of the present invention that AL's ranked lists outperform random sampling methods, thereby helping transcription and labeling lab 270 to make the best use of its fixed-resource staff.

As described above, one of the benefits of having an integrated AL process for ASR and SLU is the gain in processing efficiency. A first efficiency is evident in the ability of AL SLU component 230 to use the 1-best hypotheses output generated by AL ASR component 220. Another efficiency is gained through the minimization of the efforts of transcription and labeling lab 270. Here, duplication in transcription effort is eliminated through the creation of mutually exclusive ASR and SLU ranked lists.

Further advantages of integrating the ASR and SLU processes are evident in the example AL loop depicted in FIG. 7. As illustrated, the AL loop includes an ASR segment and a SLU segment.

The ASR segment includes ASR component 710. As described above, ASR component 710 is trained using transcribed data 714. Once trained, ASR component 710 can then proceed to review untranscribed data 712 to identify a set of untranscribed data that should be transcribed. This set of untranscribed data is illustrated as ASR ranked list 716. ASR ranked list 716 is then provided to transcription component 718 to be transcribed.

Similarly, the SLU segment includes SLU component 720. As described above, SLU component 720 is trained using annotated data 724. Once trained, SLU component 720 can then proceed to review unannotated data 722 to identify a set of unannotated data that should be annotated. This set of unannotated data is illustrated as SLU ranked list 726. SLU ranked list 726 is then provided to annotation component 728 to be annotated.

As illustrated in FIG. 7, results from transcription component 718 can also be used by annotation component 728. This flow of transcription data is represented by path 730. In one scenario, path 730 represents the leveraging of data by the SLU segment that was previously created by the ASR segment. For example, assume that an audio file was selected for transcription one day and later transcribed. If that same audio file is selected for annotation on another day, then a search of previously transcribed data can be performed to determine whether a transcription has already been performed. In this case, the transcription already exists. Thus, labeling of the transcribed data is all that is required.

The ASR segment can also leverage the annotation results of the SLU segment. Here, since each annotation includes both a transcription and a label, the transcription portion of the annotation data can be used by the ASR segment regardless of whether active learning ASR component 710 has selected that particular audio file for transcription. This flow of data from the SLU segment to the ASR segment is represented by path 740. All available sources of transcription data are therefore utilized in the training of ASR component 710.

Another advantage of coupling the ASR and SLU segments is the ability to maximally utilize the fixed resources in transcription and labeling lab 270. In general, the parameters of the AL process depicted in FIGS. 2 and 7 are based in large part on the capacity of transcription and labeling lab 270. Here, one of the goals is to ensure that the AL process generates an amount of transcription and labeling work that can be completed in a required timeframe (e.g., one day).

One of the features of the present invention is to leverage this fixed resource to produce a maximal effect. To illustrate this feature, consider a scenario where the number of audio files that are selected for transcription and annotation is roughly equal. This initial setting would enable both the ASR and SLU models to be trained with roughly the same amount of additional training data. Assume that, over time, it is recognized that the SLU model requires more significant improvement as compared to the ASR model. In this case, the number of audio files needing transcription and the number of audio files needing annotation can be adjusted. While the ratio is adjusted, the overall resources required of transcription and labeling lab 270 can remain the same. This ensures that transcription and labeling lab 270 is not overwhelmed even when a particular model requires an above average amount of new data for training.

As thus described, the AL ASR and SLU components can be run in an integrated manner to achieve efficiencies, especially when considering the leveraging of fixed resources. In the above description, the ASR and SLU components are run in parallel. In an alternative embodiment, the ASR and SLU components can be run consecutively. For example, the AL process can be designed such that the ASR component runs first selecting a subset of the utterances for transcription. Next, the SLU component would select the utterances to be labeled from the subset of transcribed audio files. In yet another embodiment, the ASR component would run first eliminating uninformative utterances, and then the SLU component would select the ones to be annotated from among the remaining ones.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the preferred embodiments of the invention may be described with reference to ASR and SLU components within a spoken dialog system. However, the invention may have applicability in a variety of environments where ASR and SLU may be used. Therefore, the invention is not limited to ASR and SLU within any particular application. Accordingly, the appended claims and their legal equivalents only should define the invention, rather than any specific examples given.

What is claimed is:

1. A method of generating a spoken dialog system, the method comprising:

generating a first ranked list of audio dialog files that is output by an Automatic Speech Recognition (ASR) module;

generating a second ranked list of audio dialog files that is output by a spoken language understanding (SLU) module;

comparing the first ranked list of audio dialog files with the second ranked list of audio dialog files; and removing duplicate files, wherein the removal of duplicate files avoid unnecessary transcription.

2. The method of claim 1, wherein generating the first ranked list of audio dialog files further comprises:

training an ASR model with transcription data;

ranking audio dialog files that were provided in preparation for the training;

converting each audio dialog file into a cepstrum format to provide a plurality of cepstrum files;

generating a binary finite state machine (FSM) for each cepstrum file;

ranking each FSM associated with each cepstrum file;

mapping the ranked FSM associated with each cepstrum file back to the audio dialog files to generate the first ranked list of audio dialog files.

3. The method of claim 1, wherein generating the second ranked list of audio dialog files further comprises:

training an SLU classifier model using annotation data;

upon detection of a flag, obtaining best path information generated by the ASR module;

ranking the list of audio dialog files to generate the second ranked list of audio dialog files.

4. The method of claim 1, further comprising:

truncating the generated second ranked list to a predefined number of entries; and removing any entry in the first ranked list that is in the truncated ranked list.

5. The method of claim 4, further comprising truncating the generated first ranked list.

6. The method of claim 5, wherein the first and second ranked lists are mutually exclusive, the method further comprising:

transcribing and/or labeling the mutually exclusive first ranked list and second ranked list.

7. Apparatus that generates a spoken dialog system, the apparatus comprising:

a module configured to generate a first ranked list of audio dialog files that is output by an Automatic Speech Recognition (ASR) module;

a module configured to generate a second ranked list of audio dialog files that is output by a spoken language understanding (SLU) module;

a module configured to compare the first ranked list of audio dialog files with the second ranked list of audio dialog files; and a module configured to remove duplicate files, wherein the removal of duplicate files avoid unnecessary transcription.

8. The apparatus of claim 7, wherein the module configured to generate the first ranked list of audio dialog files further comprises:

a module configured to train an ASR model with transcription data;

a module configured to rank audio dialog files that were provided in preparation for the training;

a module configured to convert each audio dialog file into a cepstrum format to provide a plurality of cepstrum files;

a module configured to generate a binary finite state machine (FSM) for each cepstrum file;

a module configured to rank each FSM associated with each cepstrum file;

a module configured to map the ranked FSM associated with each cepstrum file back to the audio dialog files to generate the first ranked list of audio dialog files.

9. The apparatus of claim 7, wherein module configured to generate the second ranked list of audio dialog files further comprises:

a module configured to train an SLU classifier model using annotation data;

a module configured, upon detection of a flag, to obtain best path information generated by the ASR module; and a module configured to rank the list of audio dialog files to generate the second ranked list of audio dialog files.

10. The apparatus of claim 7, further comprising:

a module configured to truncate the generated second ranked list to a predefined number of entries; and a module configured to remove any entry in the first ranked list that is in the truncated ranked list.

11. The apparatus of claim 10, further comprising a module configured to truncate the generated first ranked list.

12. The apparatus of claim 11, wherein the first and second ranked lists are mutually exclusive, the apparatus further comprising:

a module configured to transcribe and/or labeling the mutually exclusive first ranked list and second ranked list.

13. A tangible computer-readable medium storing instructions for controlling a computing device to generate a spoken dialog system, the instructions comprising: generating a first ranked list of audio dialog files that is output by an Automatic Speech Recognition (ASR) module; generating a second ranked list of audio dialog files that is output by a spoken language understanding (SLU) module; comparing the first ranked list of audio dialog files with the second ranked list of audio dialog files; and removing duplicate files wherein the removal of duplicate files avoid unnecessary transcription.

14. The tangible computer-readable medium of claim 13, wherein generating the first ranked list of audio dialog files further comprises: training an ASR model with transcription data; ranking audio dialog files that were provided in preparation for the training; converting each audio dialog file into a cepstrum format to provide a plurality of cepstrum files; generating a binary finite state machine (FSM) for each cepstrum file; ranking each FSM associated with each cepstrum file; mapping the ranked FSM associated with each cepstrum file back to the audio dialog files to generate the first ranked list of audio dialog files.

15. The tangible computer-readable medium of claim 13, wherein generating the second ranked list of audio dialog files further comprises: training an SLU classifier model using annotation data; upon detection of a flag, obtaining best path information generated by the ASR module; ranking the list of audio dialog files to generate the second ranked list of audio dialog files.

16. The tangible computer-readable medium of claim 13, further comprising: truncating the generated second ranked list to a predefined number of entries; and removing any entry in the first ranked list that is in the truncated ranked list.

17. The tangible computer-readable medium of claim 16, further comprising truncating the generated first ranked list.

18. The tangible computer-readable medium of claim 17, wherein the first and second ranked lists are mutually exclusive, the computer readable medium further comprising:

transcribing and/or labeling the mutually exclusive first ranked list and second ranked list.

\* \* \* \* \*